No. 839,991. PATENTED JAN. 1, 1907.
A. L. COX.
LOAD BINDER.
APPLICATION FILED JULY 11, 1906.
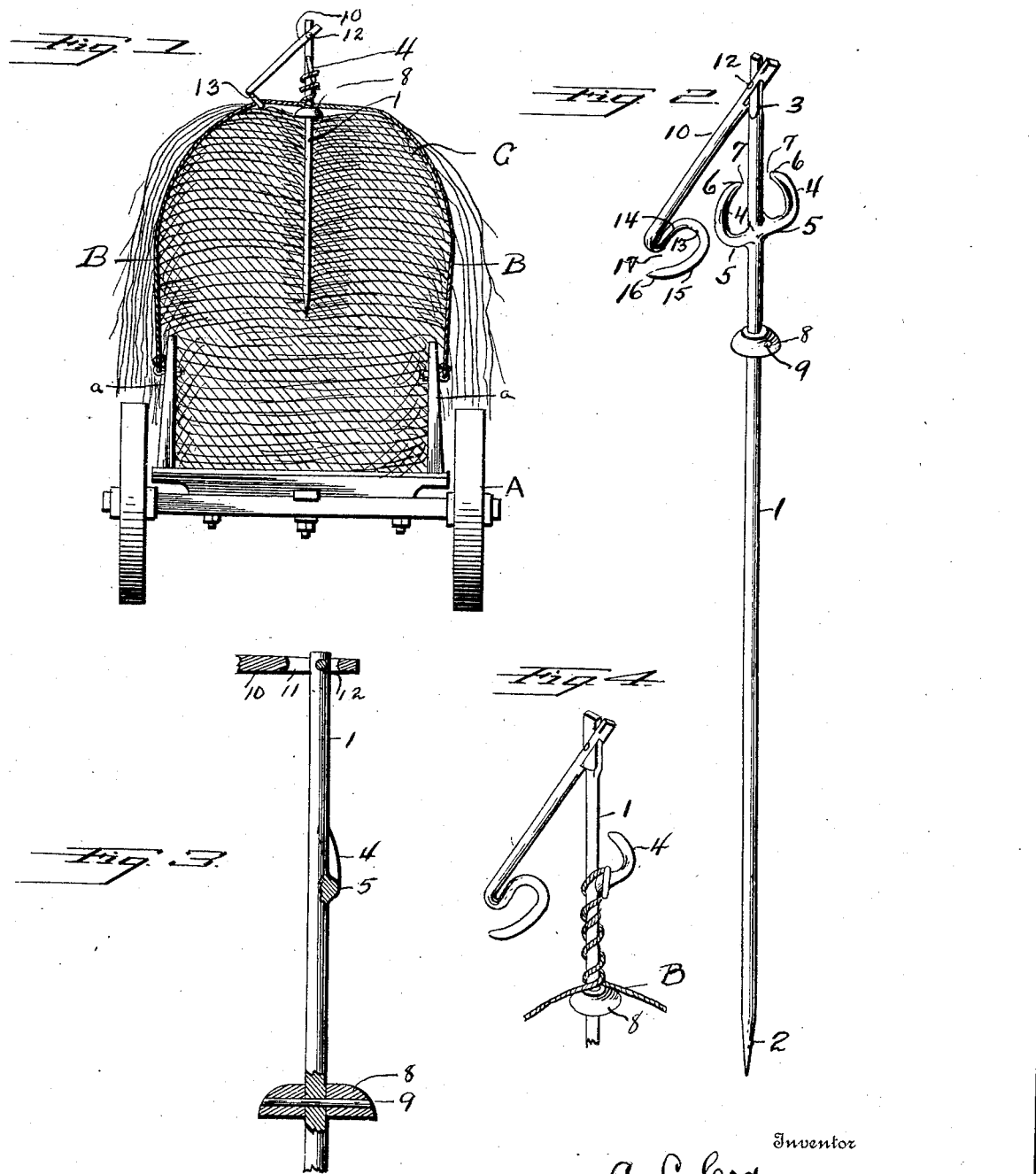

UNITED STATES PATENT OFFICE.

ALVIN L. COX, OF MADISON, MISSOURI.

LOAD-BINDER.

No. 839,991.  Specification of Letters Patent.  Patented Jan. 1, 1907.

Application filed July 11, 1906. Serial No. 325,714.

*To all whom it may concern:*

Be it known that I, ALVIN L. COX, a citizen of the United States, residing at Madison, in the county of Monroe and State of Missouri, have invented certain new and useful Improvements in Load-Binders, of which the following is a specification.

This invention relates to new and useful improvements in load-binders, and more particularly to that type in which a pointed stake for insertion into the load and carrying rope-clamping elements is employed.

The invention primarily aims in the provision of a stake carrying tines of such conformation that accidental displacement of the rope therefrom is impossible.

The invention further aims to provide novel means for preventing the insertion of the stake too great a depth within the load.

The invention further aims to provide a novel handle for rotating said stake to take up the slack of the load-binding ropes, said handle embodying a novel and peculiar form of hook for engagement with any one of said load-binding ropes to maintain the stake stationary against the torsional strain which will be exerted by said ropes.

The detailed construction will appear in the course of the following description, in which reference is had to the accompanying drawings, forming a part of this specification, like characters designating like parts throughout the several views, wherein—

Figure 1 is a rear elevation of a wagon with a load of hay in section thereupon, illustrating the mode of use of the present invention. Fig. 2 is an enlarged perspective view of a load-binder constructed in accordance with my invention. Fig. 3 is a detailed fragmentary longitudinal section, partly in elevation, thereof; and Fig. 4 is a detailed fragmentary perspective view of a slightly-modified adaptation of the invention.

In the practical embodiment of my invention my improved load-binder is used in connection with a hay-wagon A of conventional form provided with standards *a* in the well-known manner. The standards *a* have connection with the ends of binding-ropes B, by which the load of hay or other material C is held upon the wagon A.

The invention specifically embodies an elongated stake 1, which is provided with a pointed lower end 2 and is of the same diameter throughout its lineal extent, the upper end of said stake being flattened, as at 3.

In the upper portion of the stake 1 are provided vertically-extending tines 4, arranged on opposite sides thereof, which comprise a horizontal lower portion 5, extending laterally from said end, and a vertical body portion provided with an inturned extremity 6, whereby a constricted space 7 is afforded for the introduction of the rope between the tine and the stake. Disposed a short distance below the tines 4 is an enlarged button 8, which is held upon the stake 1 by a transversely-extending cotter 9. The button 8 is designed to engage the load, as shown in Fig. 1, and to prevent the insertion of the stake 1 for too great a distance therein. A handle 10 is provided at the upper end of said stake and is formed with a slot 11, which surrounds the flattened end 3. A pivot-pin 12 passes through the handle 10 and the flattened end 3 of said stake. The free end of the handle 10 is formed with an enlarged hook 13, which comprises a horizontal angularly-extending portion and an elongated portion 15, bent upon the portion 14 and having a substantially inturned extremity 16, which affords a constricted space 17 for the introduction of a binding-rope by which the stake 1 is to be locked against rotation under torsional strain. As shown in Fig. 4, only a single tine 4 is employed; but otherwise the construction and mode of operation is the same as in the above description.

In practical use the stake 1 is inserted in the load in the manner shown in Fig. 1, the button 8 engaging the load and regulating the depth of the stake therein. The binding-ropes are then thrown over the load and are introduced through the constricted spaces 7 between the tines 4 and the stake 1. The free ends of said ropes are then secured to the respective standards in the well-known manner. The handle 10 is then grasped and the stake rotated thereby, whereby the ropes B are twisted around the tines 4, as shown, in order that the slack thereof may be taken up. When the ropes B are sufficiently taut under the rotation of the stake 1, the handle 10 is swung downwardly upon its pivot and the hook 13 engaged with the desired rope B, the constricted space 17 and the inturned ends 16 preventing accidental displacement or disengagement of said rope from said hook. While the elements herein shown and described are well adapted to serve the function set forth, it is obvious that various minor changes may be made in the proportions, shape, and arrangement of the several parts without departing from the spirit and scope of the invention as defined in the appended claims.

Having fully described my invention, I claim—

1. A load-holding device comprising a pointed stake and an offset tine carried thereby and arranged in spaced parallel relation thereto, said tine being formed with an inturned extremity extending toward said stake, whereby a constricted space is afforded between said tine and said stake.

2. A load-holding device comprising a pointed stake of equal diameter throughout its length, rope-engaging elements carried thereby and an enlarged button rigidly held upon said stake beneath said rope-engaging elements.

3. A load-holding device comprising a pointed stake, rope-engaging elements carried thereby, a handle horizontally pivoted to the upper end of said stake and terminating in a hooked extremity, said hooked extremity comprising a rearwardly-extending portion bent and inturned upon itself.

In testimony whereof I affix my signature in presence of two witnesses.

ALVIN L. COX.

Witnesses:
ARTHUR DRY,
S. H. FARRELL.